United States Patent

[11] 3,554,530

| [72] | Inventor | Donald E. Moore<br>928 Potomac Ave., Erie, Pa. 16505 |
|---|---|---|
| [21] | Appl. No. | 781,641 |
| [22] | Filed | Dec. 5, 1968 |
| [45] | Patented | Jan. 12, 1971<br>Continuation of application Ser. No.<br>465,537, June 21, 1965, now abandoned |

[54] TEE SLOT LOCATOR
2 Claims, 6 Drawing Figs.

[52] U.S. Cl. .................................................. 269/301
[51] Int. Cl. .................................................. B23q 3/18
[50] Field of Search ................................... 269/47, 49,
243, 301, 82, 140, 141, 147, 203, 305, 315, 319;
29/1.5, 1.7

[56] References Cited
UNITED STATES PATENTS

| 591,424 | 10/1897 | Postmus ....................... | 29/1 |
| 459,530 | 9/1891 | Chalmers ....................... | 269/76X |
| 1,842,147 | 1/1932 | Cardner ....................... | 269/140X |
| 3,123,353 | 3/1964 | Schulze ....................... | 269/82 |
| 3,188,715 | 6/1965 | Michalsen ....................... | 269/50X |

Primary Examiner—Robert C. Riordon
Assistant Examiner—Donald D. Evenson
Attorney—Ralph Hammar ABSTRACT: A locator for work on T-slotted beds of machine tools having a body slidably received in the T-slot with means for anchoring the body in the T-slot. A pin fixed to the body upstands above the table and serves only for location. Separate clamps secure the work to the table and take the cutting loads.

INVENTOR.
Donald E. Moore
BY Ralph Hammar
Attorney

TEE SLOT LOCATOR

This application is a continuation of Serial No. 465,537, filed Jun. 21, 1965, now abandoned.

This invention is a locator for locating work on a tee-slotted table of a machine tool such as a milling machine. The locator has a sliding fit in the tee slot permitting easy movement to the desired location where it is locked in place by setscrews. Location of work on the table is achieved by either placing the work against the side of one or more locators or by having holes in the work or work holder which fit over the locators.

Figure 1:
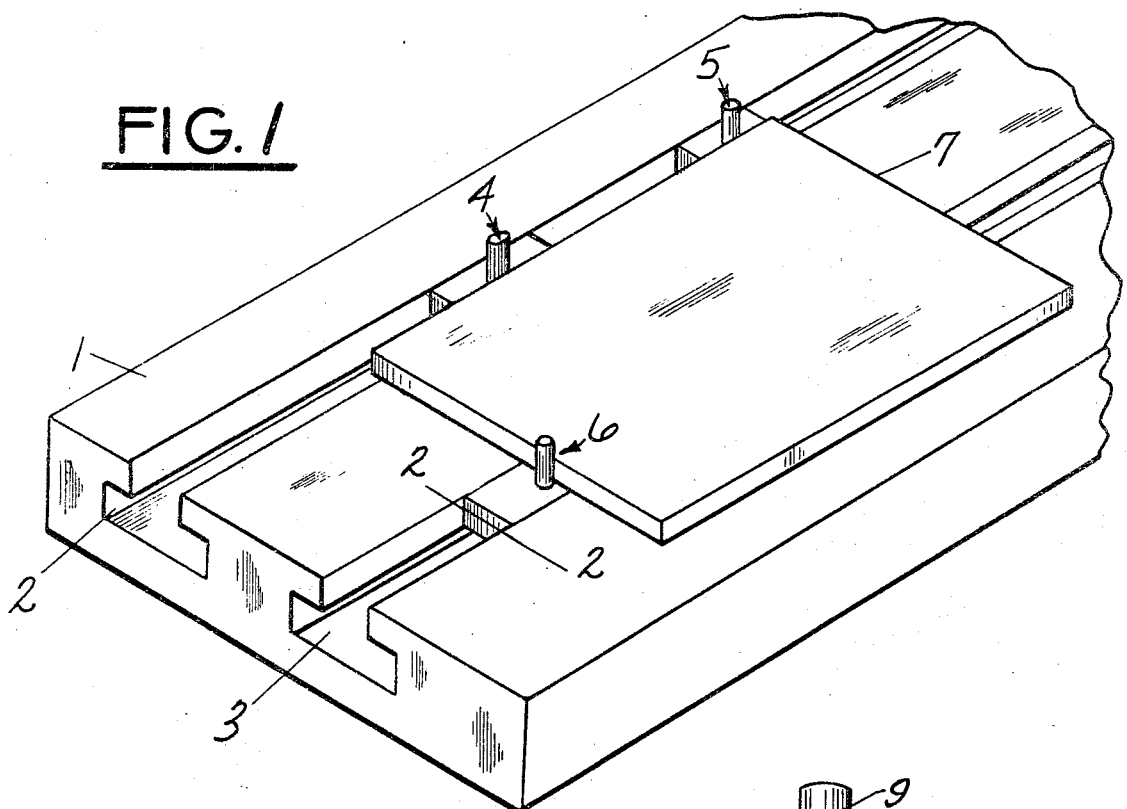
Figure 4:
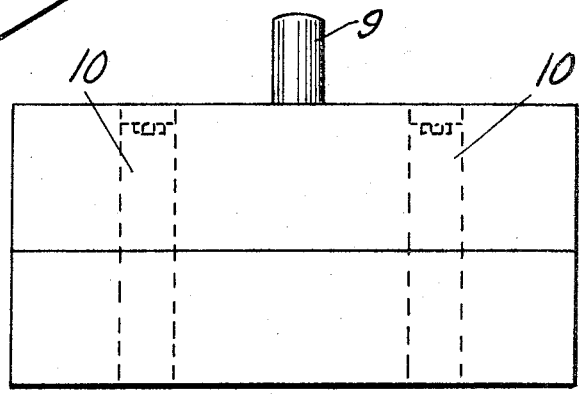
Figure 2:
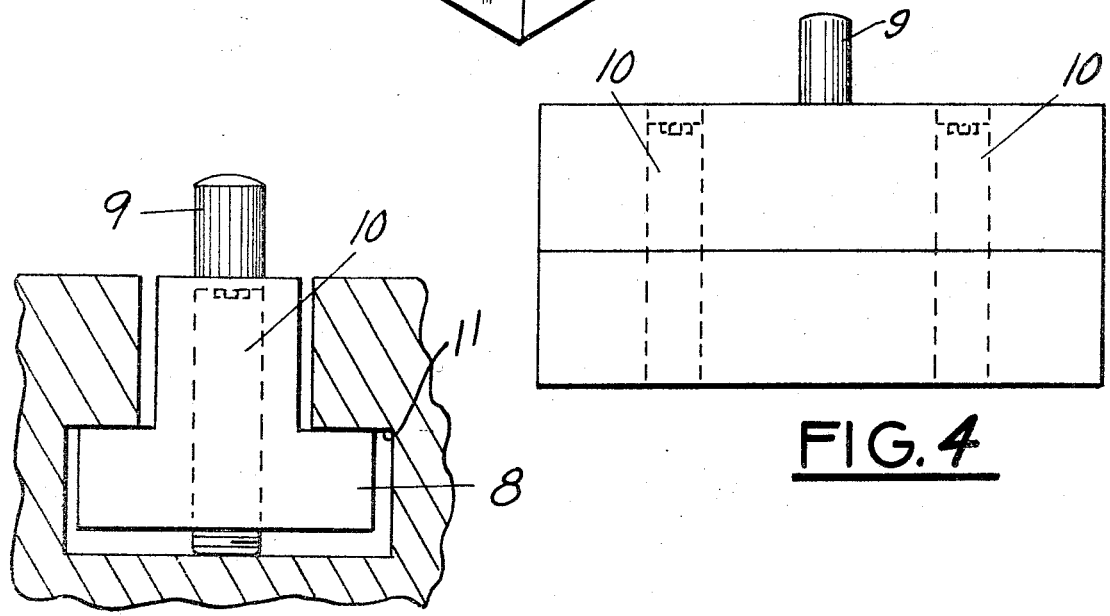
Figure 5:
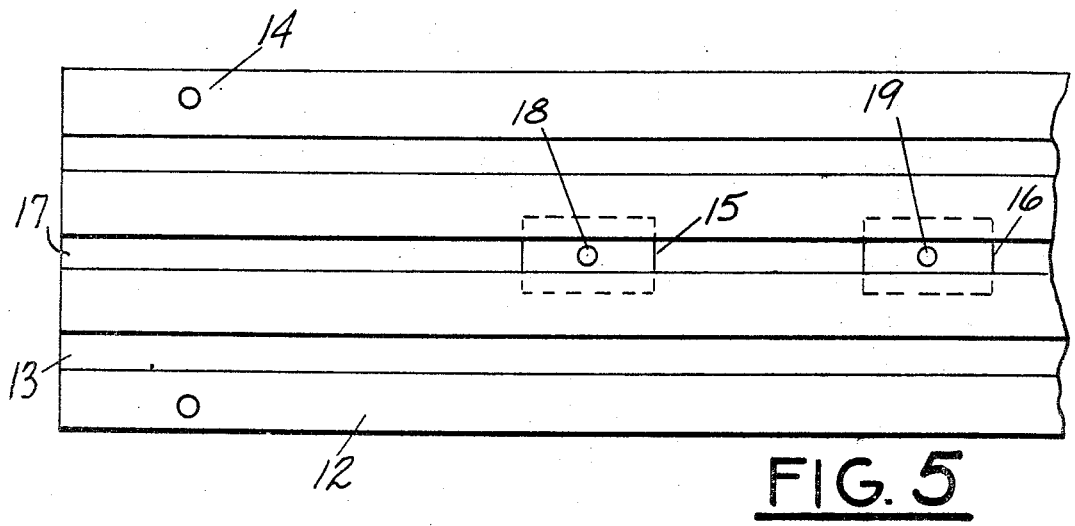
Figure 3:
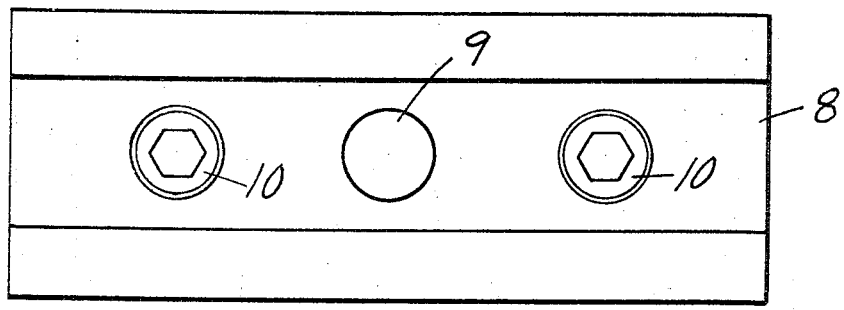
Figure 6:
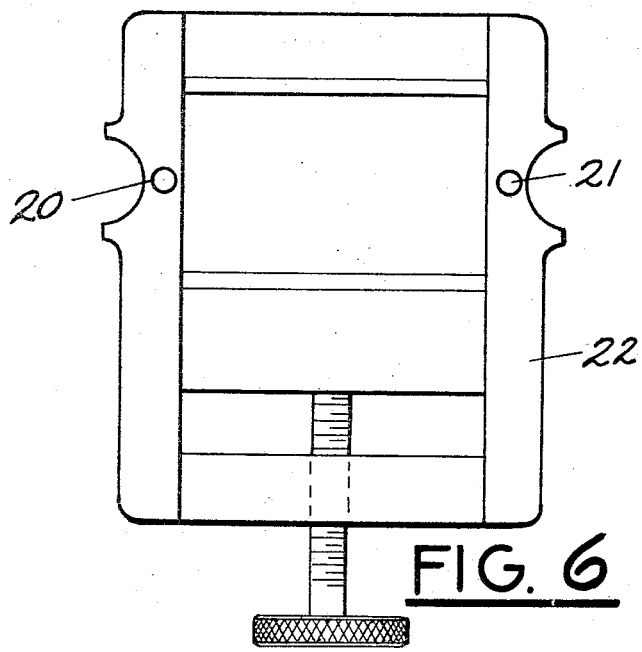

In the drawing, FIG. 1 is a perspective of a portion of a tee-slotted work table, FIG. 2 is a section on line 2-2 of FIG. 1, FIG. 3 is a top plan view of the locator, FIG. 4 is a side view of the locator, FIG. 5 is a top plan view of the table of numerically controlled machine, and FIG. 6 is a top plan view of a vise or work holding fixture for use on the FIG. 5 table. In the drawing, 1 indicates the table of a milling machine or the like having tee slots 2, 3 in which are fixed locators 4, 5 and 6 positioned to locate a work piece 7 which is suitably clamped to the table by clamps (not shown). As is customary, the stem of the tee intersects the work receiving surface of the table and the head of the tee is below said surface. The locators 4, 5 and 6 are precisely positioned on the table to locate the particular work piece 7. When the size of workpiece is changed, the locators will be set up in new positions.

Each of the locators comprises an elongated body of tee cross section 8 having a sliding fit in the associated tee slot 2 or 3, as the case may be. At the center of the body is fixed an upstanding precision ground pin 9 normal to the surface of the table and serving as a locating pin. Fore and aft of the location are set screws 10 which, when tightened, clamp the body 8 solidly against the under surfaces 11 of the tee slot. When the setscrews are tightened, the body is immovably fixed on the bed of the machine and the pin 9 is precisely positioned in the desired location on the table.

When the table is set up for a particular size workpiece, the locators are slid along the tee slots until the pins 9 are at the desired locations. The locators are then easily locked in place by tightening the setscrews. It is not necessary that three locators be used. Only one or two may be necessary for some kinds of work. Location of the work is achieved by bringing the desired portion of the work (or of the work holder) into engagement with the pins, for example by placing the work against the side of one or more of the locator pins 9 as shown in FIG. 1 or by having holes in the work or work holder which fit over the locating pins. The pins have a locating function and do not take the work clamping or cutting loads.

In the claims the term work is used to include work mounted in a fixture or work holder.

In FIG. 5, there is shown a worktable 12 for a numerically controlled machine having tee slots 13 and a machine zero 14. In this setup, two locators 15 and 16 are used which are positioned in tee slot 17 so that the pins 18 and 19 are spaced apart to fit in holes 20 and 21 in a vise or work fixture 22. The vise 22 is an exemplar of a device for fastening the work to the table. Other fixtures may be used. By having two identically spaced holes bored into all vises and work-holding fixtures, the fixtures can be interchangeably mounted on the pins 18, 19 while maintaining a constant position with relation to machine zero 14. A similar interchangeability is possible in pantographs or engraving machines using left- and right-hand pantograph plates. By drilling two identically spaced holes on a center line as common to both right- and left-hand plates, the plates can be interchanged without disturbing the setup.

This interchangeability is not limited to the numerically controlled machines.

I claim:

1. In combination, a tee-slotted table of a machine tool having a work receiving surface to which work to be machined is adapted to be clamped by separate clamps and a plurality of tee slots in the table with the stem of the tee intersecting said surface and the head of the tee below said surface, a locator for positioning work on said table consisting of an elongated body of tee section slidably received in one of said tee slots, said body having fixed therein a single upstanding cylindrical positioning pin projecting above said one slot and serving as slot a locating pin for engaging a portion of the work to locate it on said surface of the table, and means for anchoring the body in the slot to fix the pin in the desired location on the table, said locator being entirely received in said tee slot with the exception of said cylindrical positioning pin which is arranged to project above the table surface as a work positioning member and said pin having only a work locating function and not taking the work clamping or cutting loads.

2. The combination of claim 1 in which the means for anchoring the body comprises set screws in the body fore and aft of the pin and entirely received in said tee slot and having lower ends engaging the bottom of the slot and anchoring the body in the slot by clamping the body against the under surface of the head of the tee slot.